(12) United States Patent
Anderson et al.

(10) Patent No.: US 6,970,831 B1
(45) Date of Patent: Nov. 29, 2005

(54) METHOD AND MEANS FOR EVALUATING CUSTOMER SERVICE PERFORMANCE

(75) Inventors: Nancy L. Anderson, Huxley, IA (US); Lois J. Pannkuk, Fort Dodge, IA (US)

(73) Assignee: PerforMax, Inc., Huxley, IA (US)

( * ) Notice: Subject to any disclaimer, the term of this patent is extended or adjusted under 35 U.S.C. 154(b) by 670 days.

(21) Appl. No.: 09/255,968

(22) Filed: Feb. 23, 1999

(51) Int. Cl.$^7$ ............................................... G06F 17/60

(52) U.S. Cl. ................... 705/11; 705/8; 705/9; 705/10; 705/1; 186/35; 186/36; 186/37; 186/52; 186/53; 186/59

(58) Field of Search .................. 705/8–11; 180/35–37, 180/52, 53, 59

(56) References Cited

U.S. PATENT DOCUMENTS

| | | | | |
|---|---|---|---|---|
| 4,345,315 A | * | 8/1982 | Cadotte et al. | 364/900 |
| 5,510,828 A | * | 4/1996 | Lutterbach et al. | 348/13 |
| 5,893,075 A | * | 4/1999 | Plainfield et al. | 705/14 |
| 5,923,247 A | * | 7/1999 | Dowden et al. | 340/506 |
| 5,926,794 A | * | 7/1999 | Fethe | 705/11 |
| 6,065,679 A | * | 5/2000 | Levie et al. | 235/462.47 |
| 6,102,287 A | * | 8/2000 | Matyas, Jr. | 235/380 |
| 6,502,745 B1 | * | 1/2003 | Stimson et al. | 235/375 |

* cited by examiner

Primary Examiner—James A. Reagan
(74) Attorney, Agent, or Firm—McKee, Voorhees & Sease, P.L.C.

(57) ABSTRACT

A method for evaluating customer service performance is implemented by a computer software application. Customers are presented with transaction specific questions to evaluate particular employees. A customer's response to a survey question is stored on a computer. Different performance indicators are calculated for the employee based on the responses to the customer surveys. The employee is evaluated based on these performance indicators.

19 Claims, 6 Drawing Sheets

METHOD AND MEANS FOR EVALUATING CUSTOMER SERVICE PERFORMANCE

BACKGROUND OF THE INVENTION

A. Field of the Invention

The present invention relates to a method for evaluating customer service performance. More specifically, the present invention relates to surveying customers automatically using an electronic medium and recording each customer's response. Employees can then be evaluated based on customers' responses.

B. Problems in the Art

Over the years, many different methods for evaluating customer service performance have been utilized. These methods have included direct mail surveys, mystery shopping, telephone surveys, and comment cards. However, these methods all suffered from one defect or another. For example, a mail or telephone survey would only indicate a customer's general evaluation of service quality. In addition, responses to phone and mail surveys were not transaction specific, leaving an employer without information as to which employees should be rewarded or disciplined based on the customer's response.

Mystery shoppers and comment cards could be utilized for direct evaluation of a specific employee. However, both of these methods only measure a small number of transactions. Furthermore, a mystery shopper does not give any direct correlation to the satisfaction of an actual customer. In addition, comment cards are disproportionately filled out by disgruntled customers, leaving management in the dark as to which employees are doing well.

Therefore, it is a primary object of this invention to provide an improved method for evaluating customer service performance.

Another object of the invention is to provide a method for evaluating customer service performance that can measure a customer's satisfaction for a specific transaction.

A further object of the invention is to provide a method for evaluating customer service performance that will have a high response rate.

A still further object of the invention is to provide a method for evaluating customer service performance that will allow for a direct evaluation of specific employees.

Another object of the invention is to provide a method for evaluating customer service performance that will enhance client satisfaction by allowing management to identify sub-standard employees.

A further object of the invention is to provide a method for evaluating customer service performance that will allow management to reward exemplary employees by identifying employees that receive high scores for customer satisfaction.

These and other objectives, features, and advantages of the invention will become apparent from the following description and claims in conjunction with the accompanying drawings.

SUMMARY OF THE INVENTION

A method for evaluating customer service performance comprises asking a customer one or more questions at the point of transaction. The question(s) should be designed to gauge customer service performance. Preferably, the question(s) will be presented to the customer on the display of an electronic payment device.

The customer's response(s) to the question(s) will be recorded. Preferably, the customer will enter his/her response(s) on the keypad of an electronic payment device. The response(s) will then be transmitted to a computer, and stored on the computer.

The question(s) that the customer answered and the identification of the employee that served the customer are linked to the customer's response(s). The employee's identification and the question(s) will be transmitted to the computer along with the customer's response and stored in a data structure.

Once a response has been recorded, an employee can be evaluated based on the response. While an employee could be evaluated based on a single response, preferably the evaluation would be based on multiple responses to multiple questions over a designated measurement period to allow for a more statistically meaningful evaluation.

Alternative embodiments of the present invention comprise presenting a survey of transaction specific questions either on a printed medium, over the telephone, or on television. The customer's response can then be manually entered into the computer for the printed survey form. The customer's answers for the phone survey are entered through the phone's keypad. The customer's responses for a television survey are entered using a remote control device.

The method of the present invention is implemented by a computer software application. The software application can be written in Visual Basic, C++ or another Windows® compatible programming language. The software is able to present survey questions to customers and accept and store responses to the questions. The software links a customer's response with the question he/she was asked and the employee that served him/her. The software calculates certain scores that are indicative of customer service performance, for both individual employees and various other measurement levels. The software may be configured to interface with payroll, alert management to responses which fall below a threshold, and inform a customer of a reward for answering the survey.

DETAILED DESCRIPTION OF THE PREFERRED EMBODIMENT

Figure 1:
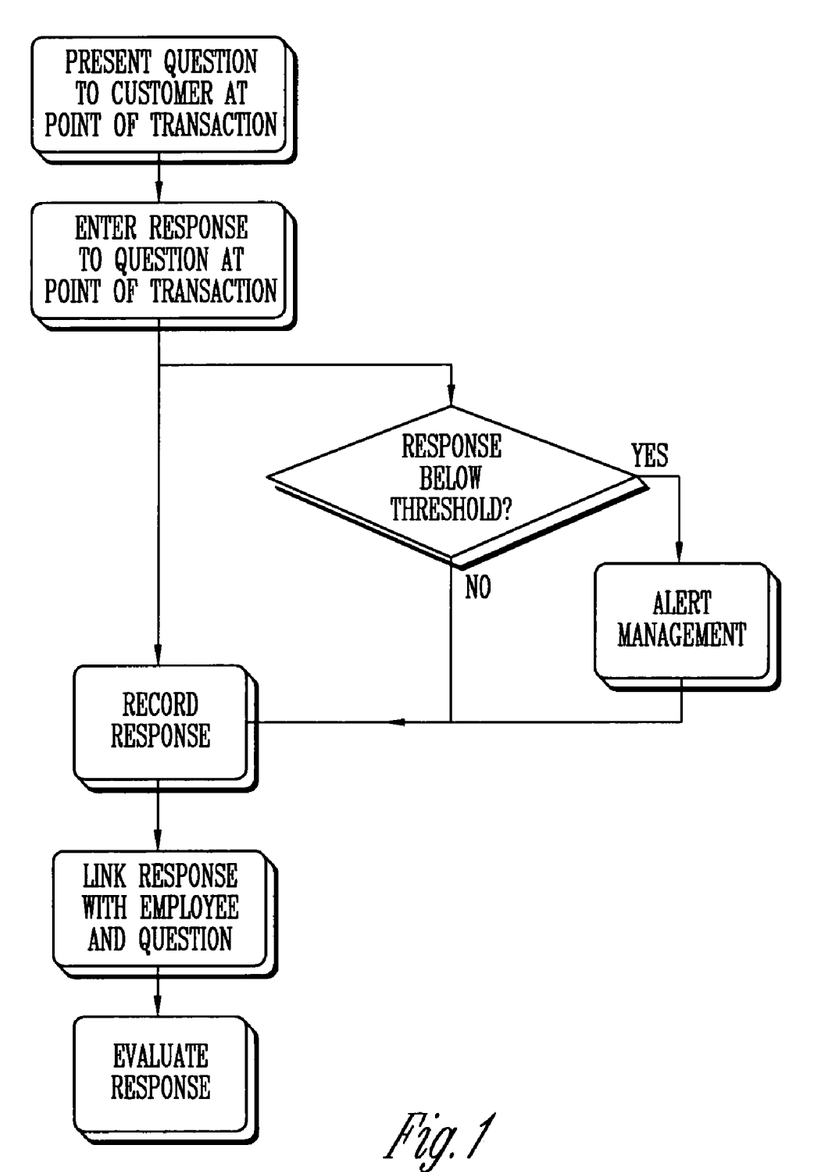
FIG. 1 is a flowchart of the method according to the present invention.

A flowchart of a preferred embodiment of the method for evaluating customer service performance according to the present invention is shown in FIG. 1. The method of the present invention is implemented by a computer software application. The method for evaluating customer service performance may be used in various environments, such as the service, retail, and hospitality industries. However, it is not intended that it be limited to those areas.

For the software that implements the present invention, three different survey systems are available. The standard survey system is comprised of pre-defined survey groups, survey categories, and corresponding survey questions. The optional survey system allows the user to choose from a list of pre-defined survey categories and corresponding survey questions. The customized survey system allows a user to input custom programming changes to define unique survey categories and survey questions to meet the user's needs.

The first step in evaluating customer service performance involves presenting one or more questions to a customer (FIG. 1). The questions should be designed to gauge an employee's customer service performance. The questions will usually be presented to the customer at the point of transaction. Preferably, the question will be displayed on the display screen of an electronic payment device or other display monitor. An electronic payment device is one that allows the customer to pay by passing a magnetic card, such as a bank card or credit card, through a magnetic card reader. Alternatively, the question could be printed on the customer's register receipt.

Figure 2:
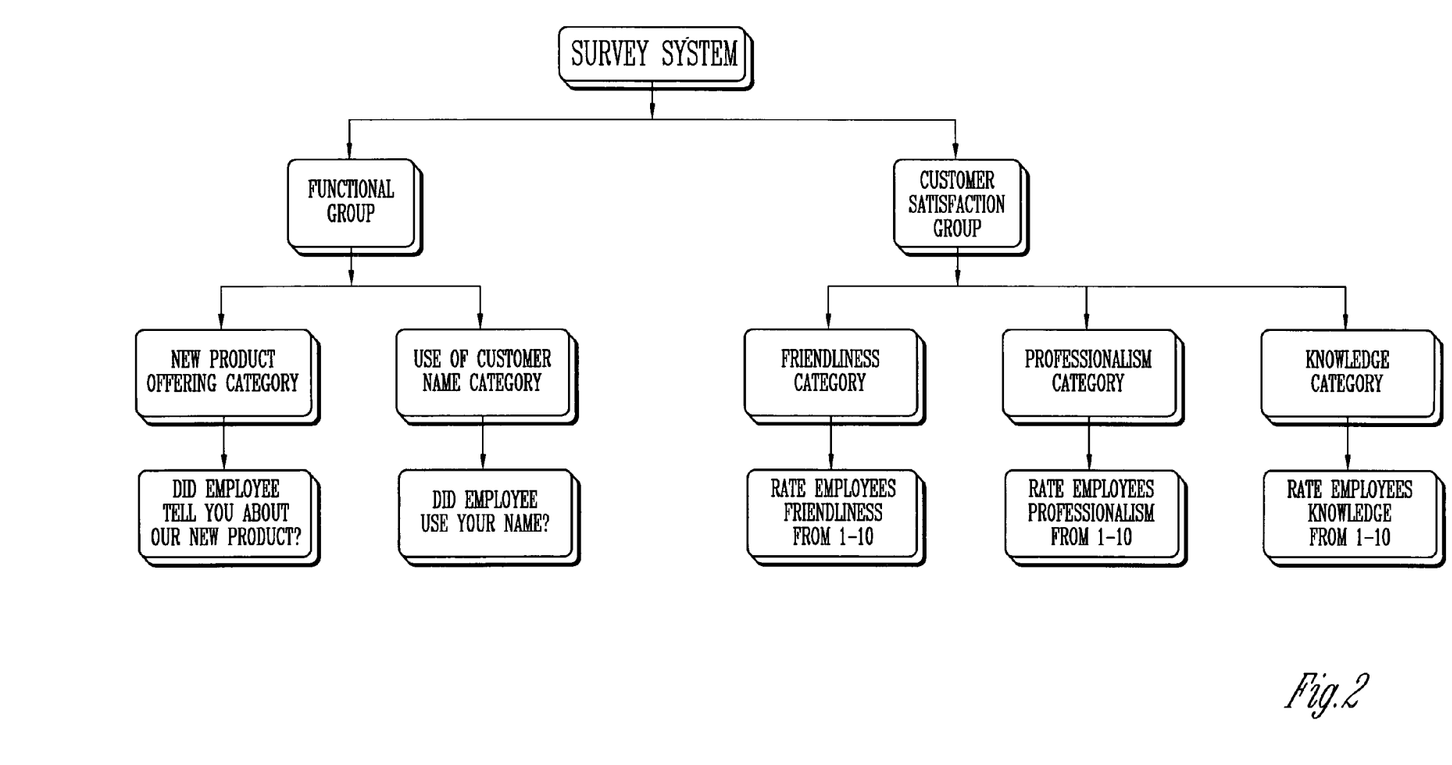
FIG. 2 is a block diagram of the survey groups and categories that will be utilized with the method of the present invention.

The questions that are presented to the customer are derived from the survey systems described above. The standard survey system is broken into two groups, a functional group and a customer service group (FIG. 2). These groups are further subdivided into categories. Friendliness is an example of a customer service category. A question from the friendliness category might ask the customer to rate the employee's friendliness, on a scale of 1–5, with 5 being the highest. A new product offering could be an example of a functional category. A question from this category might ask the customer if the employee informed the customer of a new product offering. The customer would be asked to simply give a yes/no response to this question.

After the question or questions have been presented to the customer, the customer's response is entered and recorded (FIG. 1). In the preferred embodiment, the customer will enter his response on the keyboard of the electronic payment device. The response will be electronically transmitted to a computer, and stored in the computer.

Alternatively, the customer can write his/her response on the register receipt or survey form and deposit the receipt into a box where it would get picked up and entered into the computer at a later time.

When the customer's answer is recorded, the employee's identification and the question are linked with a specific transaction. This linking is handled by the software of the present invention. The survey group and survey category are recorded along with the customer's response.

The number of customers that are asked questions will be determined by the user of the software. The user will define a frequency level which will control how many customers are asked questions. For example, a frequency level of 10% would result in approximately one of every ten customers being surveyed. The response that the customer will input depends on the question. If the question is a functional question, the customer enters a yes/no response. For a customer service question, the customer inputs a value from 1–5.

Preferably, the question that is presented to the customer will be randomly picked or generated. The software determines which question to present to the customer through a random process. The survey group, category, and question that are selected by the random process will be appropriate to the survey system selected by the user. Alternatively, the random selection may be weighted by survey category. This would allow a user to ask customers more questions from the customer service category versus the functional category, if the user so desired.

Figure 3:
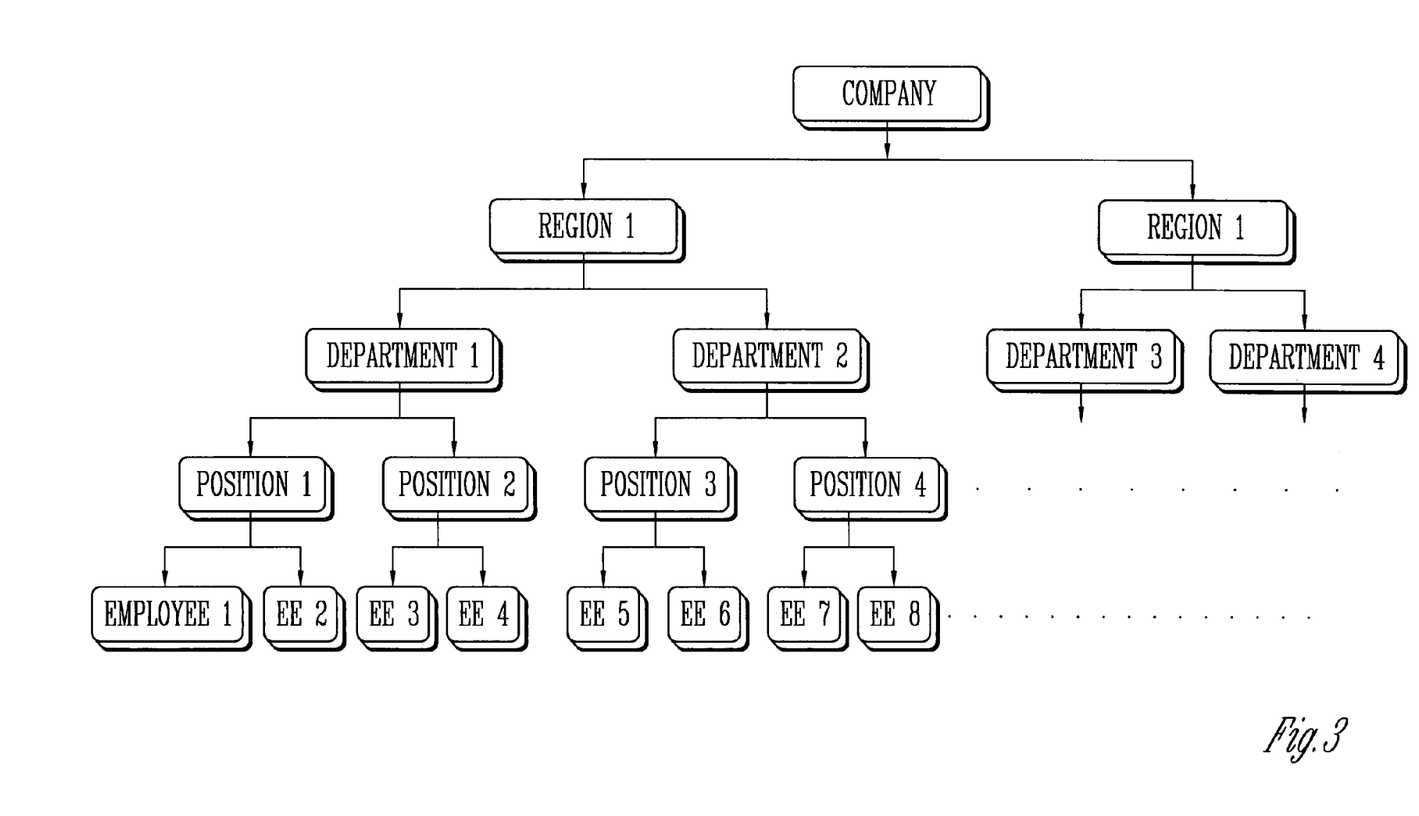
FIG. 3 is a block diagram of the scoring levels that are utilized with the method of the present invention.

The software of the present invention allows scores to be accumulated over a user defined time period. Scores can also be accumulated over multiple levels, the levels being defined by the user of the software. For example, scores for the customer service friendliness can be accumulated for each employee, the employee's position, the department, and other levels which be determined by the user of the software (FIG. 3). The accumulation of scores for individual employees and for the various other measurement levels can be collected and reviewed by management. This allows management to track the performance of individual employees, all employees with the same job position, and so on. The accumulation of scores for multiple levels gives a better indication of customer service performance throughout the company. The software also keeps track of the number of transactions for each employee, and the number of times a particular question, category, and group have been presented to customers of the individual employee.

A customer service index (CSI) can be calculated for the individual employee and for each measurement level. The CSI can be calculated for each survey category and each survey question from the customer service group. The CSI is used to measure how well the employee is doing on questions that are derived from the customer service group. The CSI is calculated by converting the customers' response scores to percentage scores.

An example of a CSI calculation is presented here. If, for example, a single question from the friendliness category had been presented to four different customers, and their responses had been 5, 5, 4, and 4, the employee's CSI for that particular question would have been 90%. The CSI for an individual question is determined by the formula CSI= (sum of scores/5n)×100%, where sum of scores is the total of the all the responses for the particular question for the measurement period, and n is the number of times the particular question had been asked. The measurement period is the time period over which management has elected to keep track of scores.

In a similar manner, a functional ratio (FR) can be calculated. The FR is calculated for a particular functional question by summing the number of "yes" responses, dividing that number by the total number of times the question had been presented, and converting the quotient into a percentage. For example, if four customers were asked if they had been told of a new product offering, and three had answered yes, the employee's FR for that particular question would be 75%.

An employee's performance score (PS) could be calculated from a weighted average of the FR and the CSI. The weight given to each score would depend on the employer's preference. If, for example, the employer placed a great value on the CSI it might be weighted to account for 80% of the PS, and the FR would be weighted to account for 20% of the PS. Using the numbers from the above example would give PS=0.8(90%)+0.2(75%)=87%. The CSI, FR, and PS can all be utilized in evaluating an employee's customer service performance. In a like manner, the CSI, FR, and PS for each survey group, category, and question can be determined for each employee and all of the measurement levels.

The software application can also be configured to alert management when a response falls below a given threshold (FIG. 1). The alert feature will report the employee name, the customer name (if available), and the survey question and response to management. The alert feature would allow management to solve customer service problems more quickly by following up with both the employee and, if possible, the customer. The alert could also have a follow-up feature to remind management, at a future date, to follow up with the customer who was dissatisfied.

A customer benefit/incentive could also be utilized with the present invention. For example, the display screen on the electronic payment device could inform the customer that he/she would receive a coupon for $1 for answering the question. This incentive would help to insure a high response rate to the survey.

The customer service indicators (CSI, FR, PS) could also be used to adjust employees compensation. For example, the employee's compensation could be increased $1/hr. for a measurement period where the employees PS exceeds 90%. The indicators can be integrated into an existing payroll software package, by interfacing the software of the present invention with the payroll software, or could be produced in a report form to allow management to manually adjust compensation levels.

Figure 4:
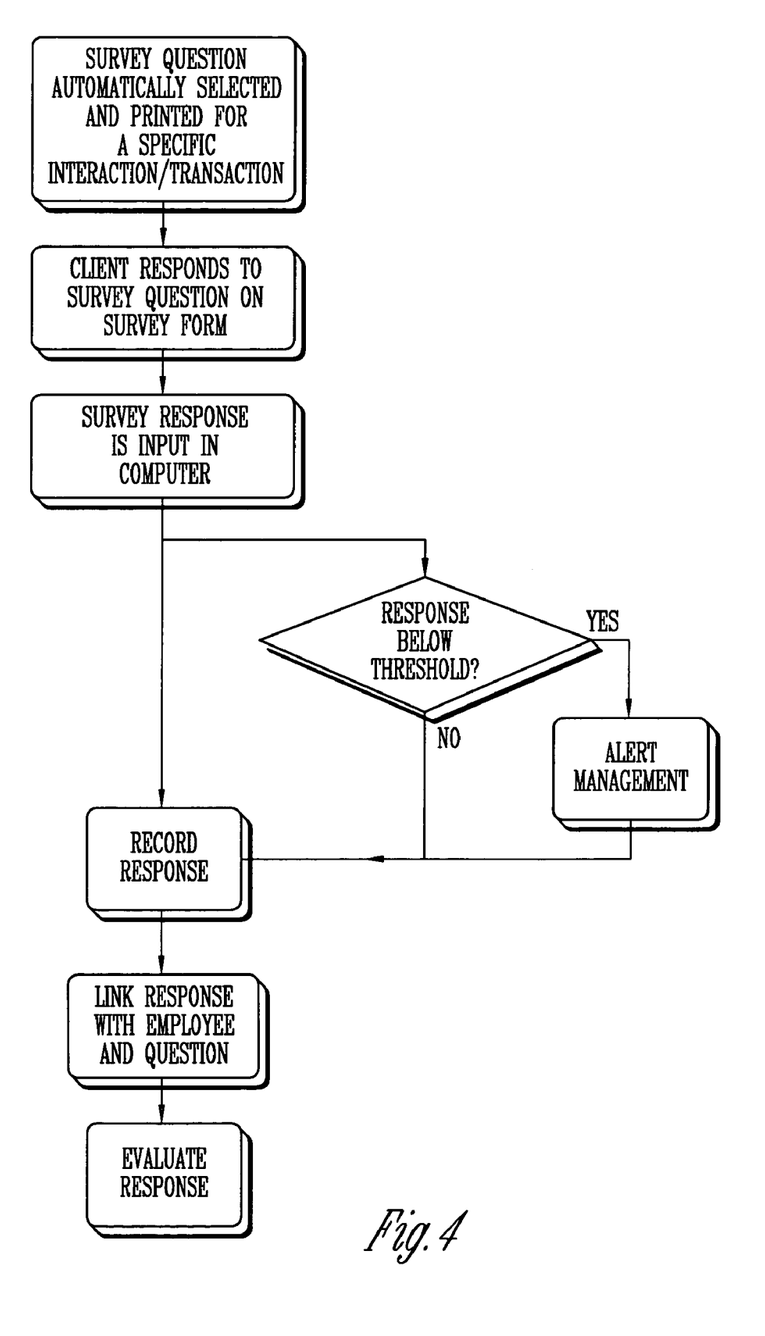
FIG. 4 is a flowchart of a second embodiment of the method according to the present invention.

A second embodiment of the present invention is shown in FIG. 4. A business interaction will prompt an automated survey through an attached printer. The survey questions will be transaction specific. The survey can be immediately given to the client or mailed to the client at a later time. The survey response is entered into a computer, and then the answers are evaluated in the same manner as described above. The automated survey method is particularly suited to service industries, such as banking and insurance, and hospitality industries, such as hotels and restaurants.

Figure 5:
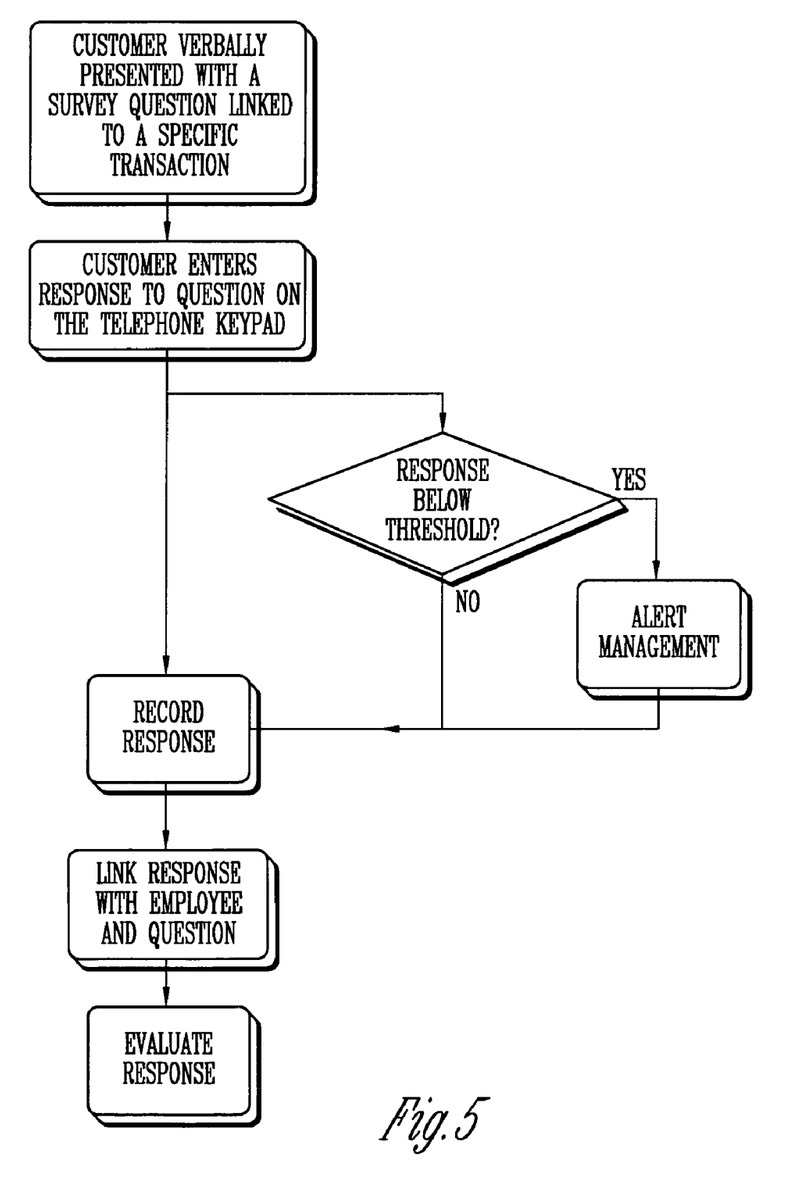
FIG. 5 is a flowchart of a third embodiment of the method according to the present invention.

A third embodiment of the present invention is shown in FIG. 5. In this embodiment, a customer is asked a transaction specific question over the telephone. The customer's response is entered on the keypad of the telephone. The response is transmitted to a computer over the phone line or it can be entered into the computer manually. Responses can then be evaluated. The electronic phone survey is well suited to the hospitality industry, e.g., hotels and motels.

Figure 6:
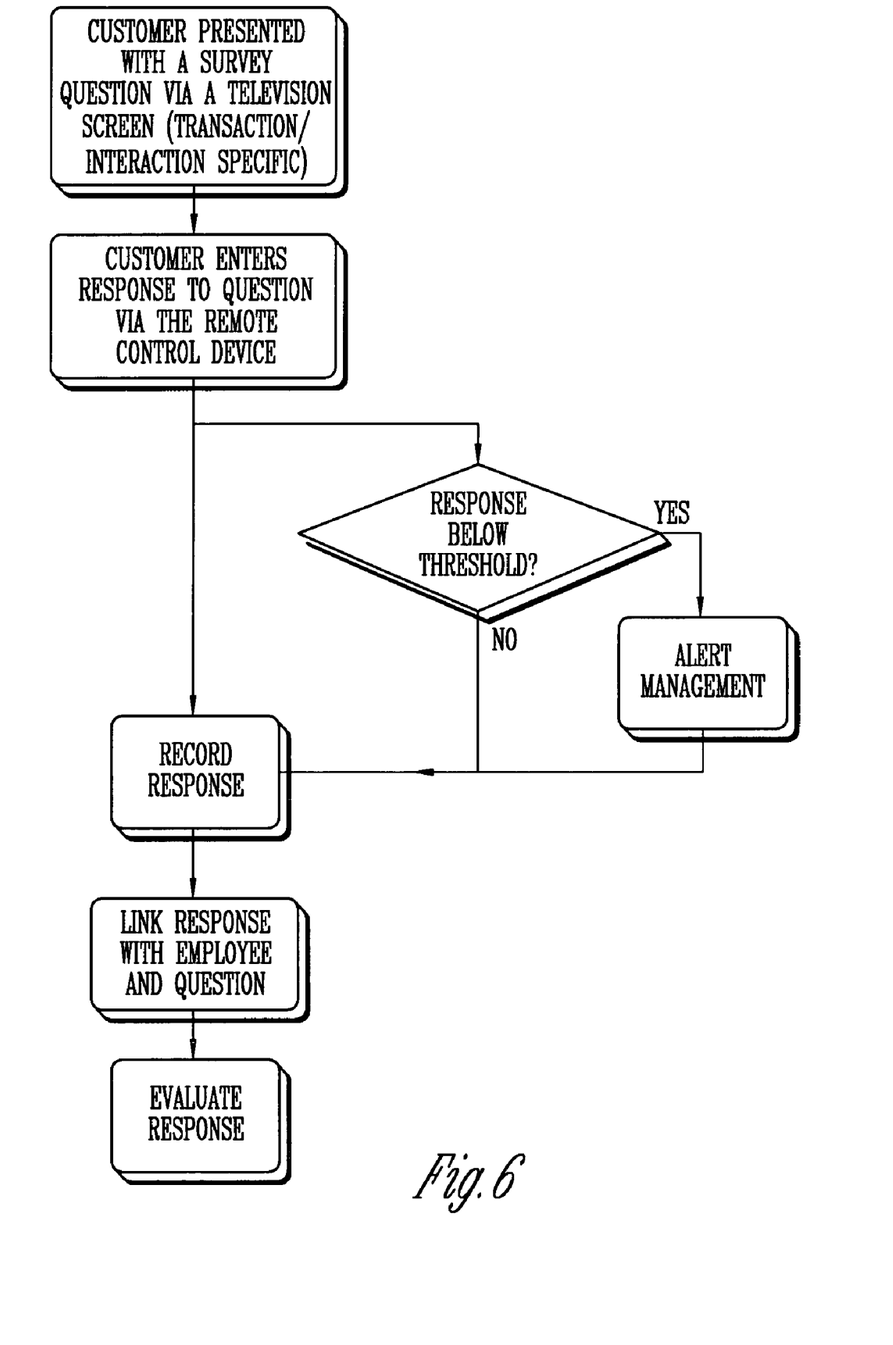
FIG. 6 is a flowchart of a fourth embodiment of the method according to the present invention.

A fourth embodiment of the present invention is shown in FIG. 6. A client is offered the opportunity to respond to a survey through a television. The survey questions are transaction specific. The client's response is entered through a remote control device. The television survey is particularly suited to the hotel setting.

In the drawings and specification there has been set forth a preferred embodiment of the invention, and although specific terms are employed, these are used in a generic and descriptive sense only and not for purposes of limitation. Changes in the form and proportion of parts as well as in the substitution of equivalents are contemplated as circumstances may suggest or render expedient without departing from the spirit or scope of the invention as further defined in the following claims.

What is claimed is:

1. A method of evaluating customer service performance of a specific employee at the originating point of transaction and at the originating time of transaction, comprising:
presenting a question to a customer at the originating point of transaction and the originating time of transaction about the employee's performance using an electronic payment device;
obtaining a response to the question from the customer at the originating point of transaction using the electronic payment device;
recording the customer's response;
evaluating the response.

2. The method of evaluating customer service performance according to claim 1, further comprising:
linking the question and response with the employee who served the customer.

3. The method of evaluating customer service performance according to claim 1 wherein the question is presented to the customer on a display of the electronic payment device.

4. The method of evaluating customer service performance according to claim 1 wherein the question is presented on a monitor of the electronic payment device and the response is entered on a keyboard of the electronic payment device.

5. The method of evaluating customer service performance according to claim 1 wherein the question that is presented to the customer is randomly picked from a group of questions.

6. The method of evaluating customer service performance according to claim 1, further comprising:
accumulating scores for questions for individual employees over a defined time period.

7. The method of evaluating customer service performance according to claim 1, further comprising:
accumulating scores for questions for different measurement levels over a defined time period.

8. The method of evaluating customer service performance according to claim 1 wherein the response is compiled in a computer.

9. The method of evaluating customer service performance according to claim 1, further comprising:
communicating an alert signal when the customer service response falls below a threshold.

10. The method of evaluating customer service performance according to claim 1, further comprising:
offering the customer a reward as an incentive to answer the question.

11. A method of evaluating customer service performance of an employee at the originating point of transaction and at the originating time of transaction, comprising:
presenting a question to a customer at the originating point of transaction and at the originating time of transaction about the employee's performance using an electronic payment device;
obtaining a response to the question from the customer at the originating point of transaction and the time of transaction using the electronic payment device; and
evaluating the response at the point of transaction and the time of transaction.

12. The method of claim 11 further comprising communicating an alert signal at the time of transaction based on the response.

13. The method of claim 11 further comprising offering the customer a reward as an incentive to provide the response to the question.

14. The method of claim 11 further comprising selecting the question to present from a group of questions using the electronic payment device.

15. The method of claim 11 wherein the point of transaction is a store, the customer and the employee being physically present at the store at the time of transaction.

16. The method of claim 11 wherein the step of evaluating the response is scoring the response.

17. The method of claim 11 further comprising storing the response.

18. The method of claim 11 further comprising tying the employee's compensation to the response.

19. A system for collecting customer feedback of an employee's performance at the originating point of transaction and at the originating time of transaction, comprising:
an electronic payment device adapted to present a question to the customer about the employee's performance and adapted to obtain a response to the question from the customer at the originating time of transaction and at the originating point of transaction;

a memory in operative connection with the electronic payment device for storing the response; and a control program adapted to link the employee and the response and adapted to cumulatively evaluate the employee's performance.

* * * * *